June 21, 1927.

L. DA C. CARVALHO

DUMPING VEHICLE

Filed Aug. 20, 1924  3 Sheets-Sheet 1

Inventor

Louis da Costa Carvalho

By his Attorneys

June 21, 1927.
L. DA C. CARVALHO
1,633,364
DUMPING VEHICLE
Filed Aug. 20, 1924    3 Sheets-Sheet 2
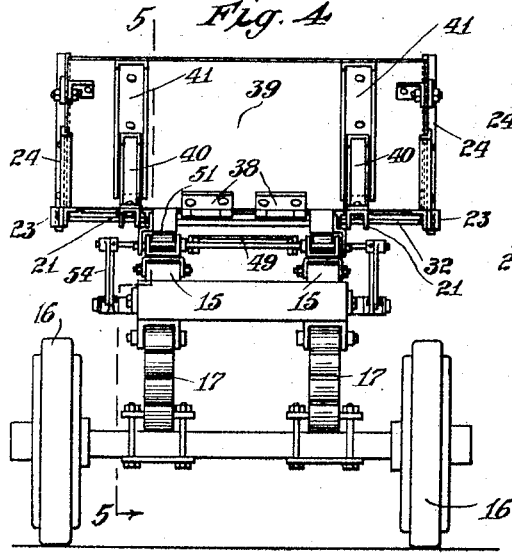
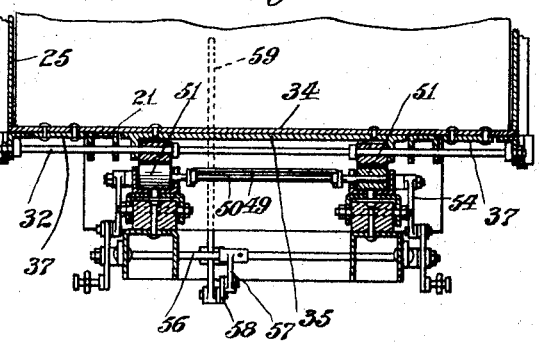
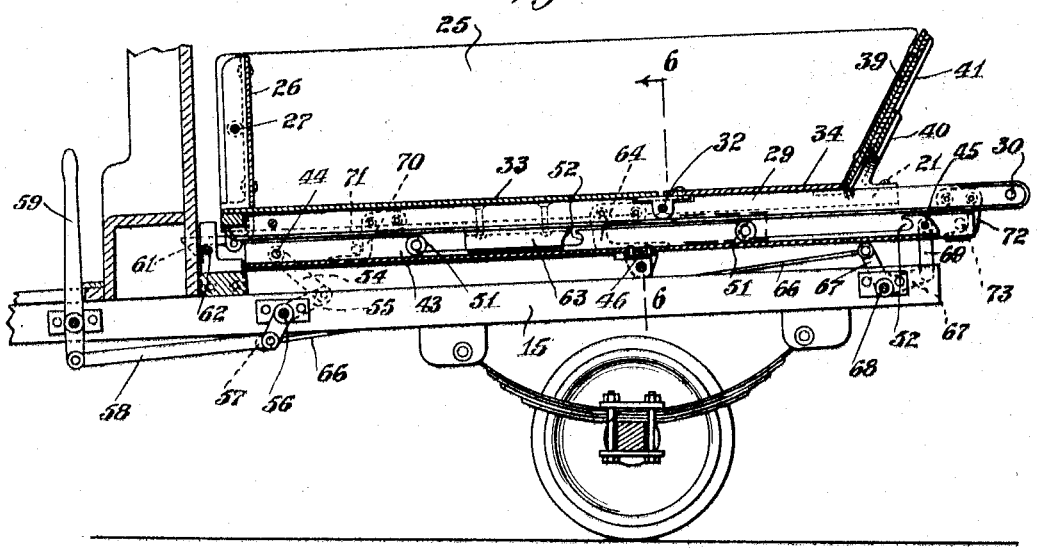
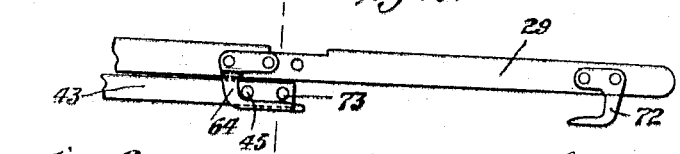
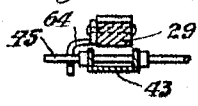
Inventor
Louis da Costa Carvalho
By his Attorneys June 21, 1927.  L. DA C. CARVALHO  1,633,364
DUMPING VEHICLE
Filed Aug. 20, 1924  3 Sheets-Sheet 3
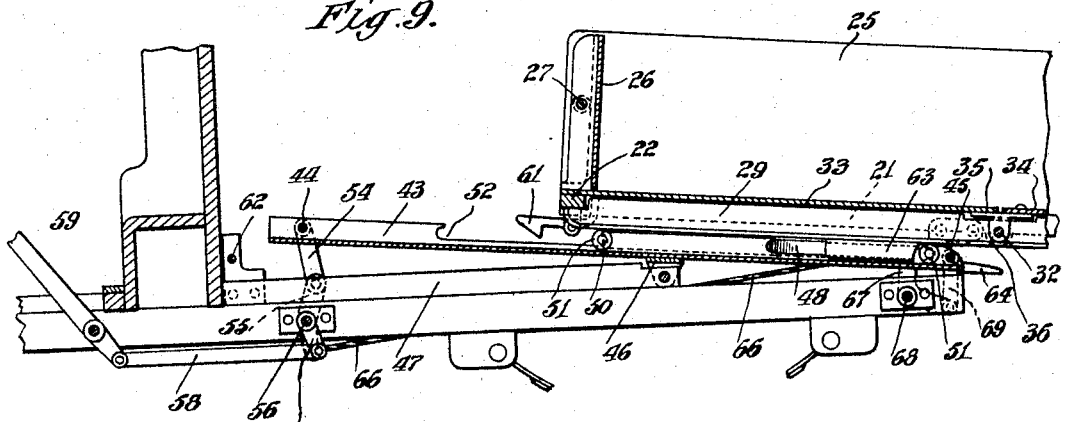
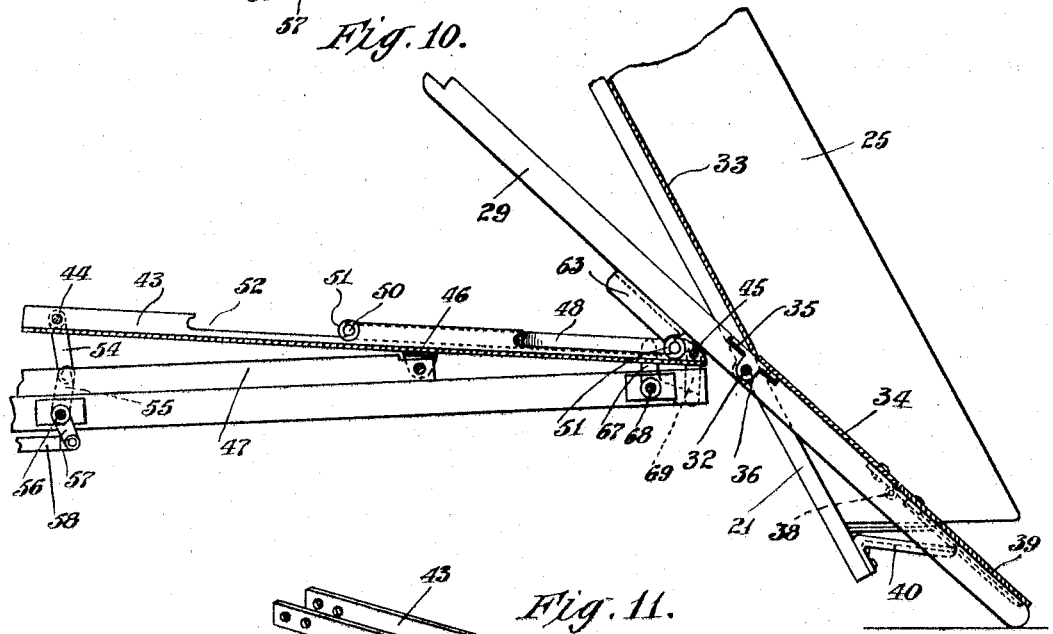
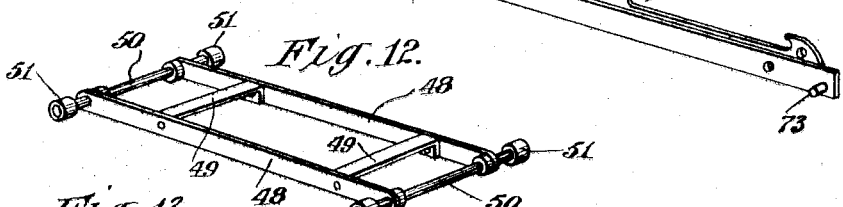
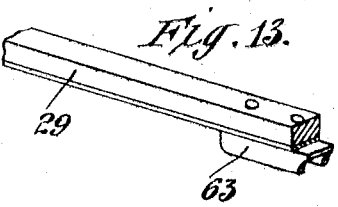
Inventor
Louis da Costa Carvalho
By his Attorneys Patented June 21, 1927.

1,633,364

UNITED STATES PATENT OFFICE.

LOUIS DA COSTA CARVALHO, OF NEW ORLEANS, LOUISIANA.

DUMPING VEHICLE.

Application filed August 20, 1924. Serial No. 733,040.

This invention relates to dumping vehicles.

It is the principal object of the invention to provide a dumping vehicle that is largely automatic in its dumping operation. More particularly it is an object of the invention to provide a dumping vehicle that is available for carrying and dumping staves, logs and the like without the necessity of manually removing and replacing posts or other load confiners; one that avoids the weight and expense of hydraulic or similar dumping mechanisms; and one that avoids the necessity of running the chassis out from beneath the body in dumping.

With these general objects in view the invention consists in the combinations, features, details of construction and arrangements of parts that will first be described in connection with the accompanying drawings and then more particularly pointed out.

In the drawings—

Fig. 4 is a rear end view, enlarged;

Fig. 5 is an enlarged sectional view taken on the broken line 5—5 of Fig. 4;

Fig. 6 is a similar view taken on the broken line 6—6 of Fig. 5;

Fig. 7 is a detail view showing part of the body frame;

Fig. 8 is a sectional view taken on the line 8—8 of Fig. 7;

Fig. 9 is a view similar to Fig. 5 but with the vehicle body moved to dumping position just prior to tilting;

Fig. 10 is a similar view with the body shown in tilted position;

Fig. 11 is a detailed perspective view of one track element removed;

Fig. 12 is a similar view of the roller frame; and

Fig. 13 is a similar view, with parts broken away and in section, of part of the body frame.

Figure 1:
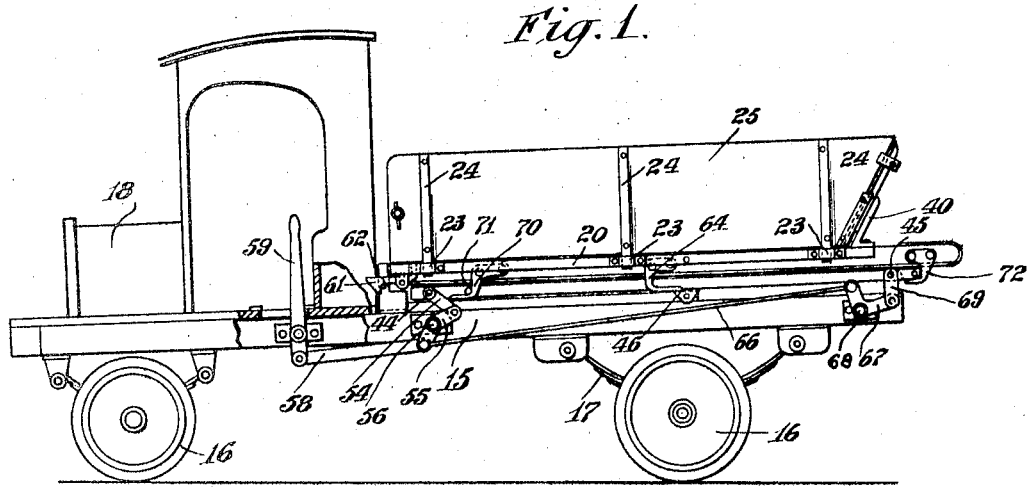
Fig. 1 is a view in side elevation, with parts in section, of a dumping vehicle constructed in accordance with the invention.

Referring to the drawings, the invention is illustrated as embodied in a vehicle of the type commonly known as a motor truck. It is to be understood, however, that the invention is applicable to flat cars, dummies, and other vehicles. The truck illustrated as an example has a chassis comprising side beams 15, running wheels 16 and springs 17, these parts being shown more or less conventionally. The motor is indicated at 18, but the motive and transmission parts are eliminated in order to simplify the drawings, as such parts may be of any well known construction. The truck shown, for reasons hereinafter described, is arranged to tilt slightly forward when empty, as illustrated in Fig. 1.

The invention in its entirety includes a body, i. e. a load container, carried by the chassis and mounted to have a bodily and tilting movement with respect thereto; and a gate on the body that is prevented from opening prior to tilting movement but is automatically permitted to open, after a given tilting movement, under the weight of the load, and that is automatically closed again upon a reverse tilt of the body. In vehicles embodying the invention to what is now considered the best advantage, the gate is pivoted to swing from the bottom and in open position forms a continuation of the body floor to act as a chute for the load. While the automatic control of the gate may be accomplished in various ways, a convenient construction embodies a vehicle body having two differentially tiltable portions, one carrying the pivoted gate and the other carrying stop means to hold the gate closed until such second portion has tilted to greater extent than the first portion, thereby to withdraw the stop means.

Figure 2:
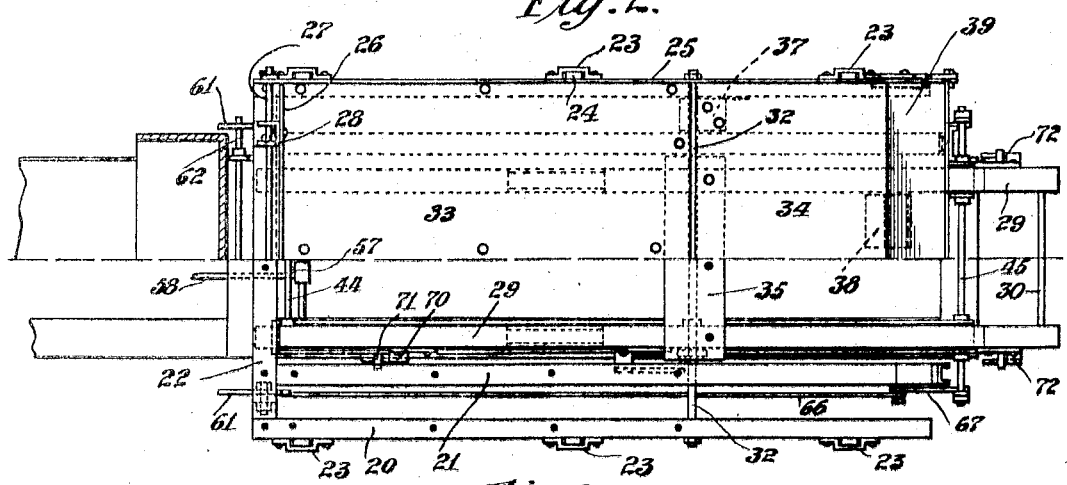
Fig. 2 is a two part top plan view, with parts in section, the one part showing the body in place and the other part having portions of the body removed.
Figure 3:
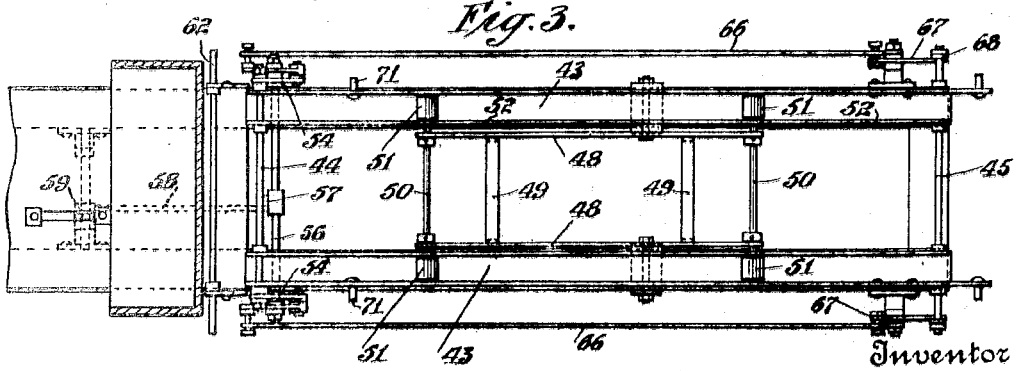
Fig. 3 is a top plan view, with parts in section, of the chassis with the body removed.

Although capable of various constructions, in that here illustrated as an example, the tilting body comprises a main frame having outer side bars 20 and inner side bars 21. Across the front is a cross bar 22. The outer side bars have sockets 23 for receiving the posts 24 of side boards 25. A front end board 26 is detachably held in place by a removable locking rod 27 passing through the side boards and through clips 28 on the front board. Associated with this main frame is a supplemental frame comprising two longitudinal beams 29 located inside the side bars 21 and extending back beyond the latter (Fig. 2). The beams have a rear cross bar 30 and at their front ends they are notched to receive the front cross bar 22 of the main frame (Figs. 9 and 10).

In the present embodiment the truck is arranged for endwise dumping and consequently the movement of the truck body is longitudinal of the chassis. As later described, in the embodiment here shown, the supplemental frame is mounted to roll on the chassis and to tilt after reaching a given position. To give the main frame a differential tilting movement it is pivoted to the supplemental frame. To this end, as shown, passing through the beams 29 and connected with the side bars of the main frame is a pivot rod 32. Thus the main frame can tilt with the supplemental frame and also can have a separate tilting movement relative thereto.

In view of the differential movement of the two body portions the floor of the body is made in two sections. As shown, a front floor section 33 is secured by rivets or in other suitable manner to the front part of the main frame. This front floor section extends back to a point adjacent the pivot rod 32. A rear floor section 34 is associated with the supplemental frame but does not extend as far back as beams 29. The two floor sections are set close together (Fig. 10) but so as to permit a relative angular movement. To prevent leakage, drip, etc., in case the trunk is carrying sand or other semi-fluid loads, a plate 35 is located below the joint between the floor sections. This plate is set in rabbeted notches in the beams 29 and has lugs 36 through which pivot rod 32 passes. Supplemental plates 37 are added between the inner and outer side bars. As shown, the rear floor section 34 is riveted to these plates.

In the present embodiment the gate is carried by the supplemental frame of the body and the gate stop means is carried by the main frame. To this end, as here shown as an example, pivoted to the rear edge of the floor section 34 by hinges 38 is a gate in the form of a tail board 39. In normal, or running, position the tail board 39 has an oblique position as appears in Fig. 5. The side boards 25 terminate in similarly oblique edges so that when the side boards are used the tail board cooperates with them to provide a box-like enclosure for loads of loose material such as sand, gravel, bricks, etc. Secured to the inner side bars 21 at the rear ends thereof are gate stops in the form of posts 40 which slant to the rear correspondingly with the slant of the normal position of the gate 39. These posts, in the normal position of the parts, are received throughout their length by channel members 41 secured to the rear face of the tail board or gate 39. It will be seen that while the posts 40 are in normal position (Figs. 1 and 5) they serve as positive stops or backings for the hinged gate which is thereby held closed. Until these posts are removed, therefore, the gate cannot open even under the weight of the load. The gate is permitted to open automatically by the withdrawal of the posts 40 due to a differential movement of the main frame, that is, when the main frame tilts beyond the supplemental frame. As later described, the body is arranged to tilt under the weight of the load. During the first part of this movement, both body portions tilt together. This continues until the ends of the beams 29 strike the ground and stop (Fig. 10) but the main frame, being shorter and being independently pivoted, can continue its tilting movement. This it does under the weight of the load against the gate which exerts a sort of wiping action against the ends of the stop posts pushing them back and so causing a tilt of the main frame. During this differential movement the ends of posts 40 slide down the channels 41 and so withdraw from gate holding position, thus permitting the gate to open under the weight of the load. The opening movement continues until the gate rests against the ends of beams 29. In this position (Fig. 10) the gate forms a continuation of the body floor, thereby acting as a chute for the load, and is supported by beams 29 which extend beyond the gate pivot. The feature of the closing of the gate after dumping is described hereinafter.

The invention in its entirety includes a mounting for the body by which it may have a bodily movement on the chassis and thereafter may tilt. In structures embodying the invention to what is considered the best advantage, both movements and the corresponding reverse movements are effected by gravity. Although capable of various constructions, in that here shown as an example, pivoted to the chassis is a tipping trackway comprising side channel elements 43, a front cross bar 44, and a rear cross bar 45. Each channel element has a clip 46 pivotally bolted to the rear end of a short supplemental side bar 47 on the chassis. Riding on the trackway is a rigid roller frame (Fig. 12) comprising two parallel side pieces 48 and two cross braces 49. Mounted in the ends of the side pieces 48 are rods or shafts 50 each of which carries two rollers 51. These rollers are received by the channels of the trackway to roll therein, the inner wall of each channel element being notched, as at 52, in two places to accommodate the rods 50. The roller frame can thus roll back and forth in the trackway, its movement in either direction being limited by the engagement of rods 50 with the ends of notches 52. The roller frame described holds the rollers 51 rigidly in alinement and the use of ball bearings is avoided.

In the the embodiment illustrated the parts are so arranged that the beams 29 ride on the rollers 51 in the manner of rails so that the body has a rolling movement on the roller frame while the frame is rolling in the trackway. This gives the body a compound bodily movement on the chassis to and from dumping position. It will be seen that this movement depends on the position of the trackway and there is provided means for controlling this position, thereby to control the body movement. Although capable of various constructions, in the present embodiment, pivoted to each end of the front cross bar 44 of the trackway is a link 54. These links are pivoted to bell crank levers 55 mounted on a rock shaft 56 carried by the chassis. On this rock shaft is a rocker arm 57 connected by a link 58 with an operating lever 59 adjacent the driver's seat. When lever 59 is moved forward, that is, from the position of Fig. 1 to the position of Fig. 9, the trackway, through the parts just described, is tipped rearwardly on its pivot. With the track thus tipped, the roller frame rolls down the trackway and the body rolls, in addition, on the roller frame, thus giving a compound gravity movement to dumping position. As the position of the track is dependent on the position of lever, and as the body movement is dependent on the track position, the operator can control, by means of the lever, the body movement by controlling the degree of tip of the track. That is, the lever not only starts the body rolling but can be operated in the nature of a brake lever to control the body movement.

There is provided means for normally latching the body against rearward rolling movement, this means being released upon operation of the control lever 59. As here shown as an example, mounted on the front end of the body are two hooks 61 which hook over a rod 62 on the chassis. With the hooks in this position (Figs. 1 and 5) the body is held from rolling movement. The hooks are so designed, however, that they clear the rod when the front end of the body is elevated with the trackway, upon operation of the lever 59.

In vehicles embodying the invention to the best advantage, the body is arranged to tilt, after its rearward rolling movement, under the weight of the load to dump the latter, and to tilt reversely by gravity after the load is removed. To his end, as here shown as an example, on each beam or rail 29 is a clip 63 the forward ends of which are curved (Fig. 13) to correspond with the rollers 51. These clips are so located that when the body has rolled to dumping position the clips engage the rear rollers 51 and can pivot around the latter. That is, the body has a free pivotal connection with the chassis so that it may tilt under the weight of the load upon reaching a given position. To hold the body in place, during tilting, as here shown as an example, on the beams 29 are hooks 64 which take under the rear cross bar 45 of the trackway (Figs. 7 and 9).

As the load is dumped, the parts are in the position of Fig. 10. The load being removed, the main body portion, which is pivoted to the beams 29 toward the rear of the former, starts to make a reverse tilt by gravity. It moves alone until the front cross bar 22 engages the notched ends of the beams 29 and thereafter the two portions move together. Thus the body is automatically returned by gravity to untilted position. With the construction described, the gate or tail board 39 is automatically closed upon the reverse tilt of the body. As the main frame makes its differential reverse tilt the ends of the stop posts 40 ride up the channel elements 41 on the gate and swing the latter closed by a kind of wiping action. By the time the main body portion has reached the end of its differential movement the posts 40 are back in initial position to hold the gate closed again.

Means is provided for causing the body, after reversely tilting, to roll back to initial position. This may be conveniently accomplished by reversely tipping the trackway by means of the operating lever 59. As here shown as an example, bell crank levers 55 are connected by long links 66 with bell cranks 67 mounted on a cross rod 68 at the rear of the chassis. These rear bell cranks are connected by links 69 with the rear cross bar 45 of the trackway. When the driver returns lever 50 to normal position, therefore, the trackway is reversely tipped to replace it in initial position in which position it tips slightly forward as before described. The roller frame and body, therefore, roll by gravity, back to initial position. As the body returns to normal position, the hooks 61 ride up rod 62 and drop into place, thus again latching the body against rearward movement.

There is provided means for preventing undue bouncing of the body while in running position. As here shown as an example, adjacent the front end of the body, beams 29 carry forwardly facing hooks 70 which hook under pins 71 mounted on the trackway (Fig. 1). Similar hooks 72 adjacent the ends of the beams hook under pins 73 on the trackway. These hooks prevent the truck body from bouncing but are so arranged, as will be apparent from the drawings, that they automatically clear their pins when the body rolls to dumping position and automatically return to hooked position on reverse body movement.

To review the operation, Figs. 1 and 5 show the truck empty, in running position, with the body held from rearward rolling by hooks 61. When the truck is loaded, preferably with the weight toward the rear, the depression of the rear springs brings the parts into substantially horizontal position so that only a slight tipping of the trackway is necessary. The gate or tail board is held closed by stop posts 40. To dump the load the driver moves lever 59 forward. Through the connections described this elevates the forward end of the trackway, hooks 61 clearing rod 62. The body and roller frame, thus released, roll by gravity to dumping position. Fig. 9 shows the body in this position just prior to tilting. Under the weight of the load, the body tilts rearwardly, the two portions moving together until the beams 29 engage the ground. Thereafter, under the pressure of the load against the gate 39, the main frame continues to tilt, this differential movement withdrawing the posts 41 and permitting the gate to swing open under the weight of the load. As the gate takes full, open position (Fig. 10) it forms a continuation of the body floor, thus acting as a chute down which the load can slide, the ends of beams 29 supporting it in this position and serving as stops to limit the swinging movement. When the load is removed, the main body portion tilts reversely by gravity picking up the supplemental frame as the front cross bar 22 engages the notched ends of beams 29, so that thereafter both portions tilt together back to horizontal position. During this reverse tilt the posts 40, riding up channel elements 41, cause the gate 39 to swing back to closed position. The driver now returns lever 59 to initial position. Through the connections described this reversely tips the trackway back to initial position so that the body rolls forward again by gravity. The parts are now in initial position ready for the next load.

It will be seen that except for the operation of lever 59 the entire dumping operation is automatic.

The box body described is suitable for loads of loose material such as sand, brick and the like. For logs, staves and similar loads, the side boards and front end board may be removed and the logs or staves loaded crosswise of the body floor. The invention provides a particularly useful vehicle for such loads, as with a gate pivoted as described and automatically controlled, the logs or staves can roll or slide off upon dumping, without the necessity of removing and reinserting end posts and the like. For such loads, the gate need not be a complete tail board, posts carrying channel elements 41 being sufficient.

What I claim is:

1. In a dumping vehicle, and in combination, a chassis, a body having a pivotal connection with the chassis whereby the body may tilt to dump the load, a gate for normally confining the load, and means for holding the gate closed prior to tilting of the body, said means being rendered inoperative by the weight of the load against the gate after a given tilting of the body, whereby the gate may then open automatically.

2. In a dumping vehicle, and in combination, a chassis, a body having a pivotal connection with the chassis whereby the body may tilt to dump the load, a swinging gate for normally confining the load, and stop elements for holding the gate closed prior to tilting of the body, said stop elements being displaceable, after a given tilting of the body, by the weight of the load against the gate, whereby the gate may then open automatically.

3. In a dumping vehicle, and in combination, a chassis, a body having a pivotal connection with the chassis whereby the body may tilt to dump the load, a swinging gate pivoted at the bottom for normally confining the load, and stop elements for holding the gate closed prior to tilting of the body, said stop elements being displaceable, after a given tilting of the body, by the weight of the load against the gate, whereby the gate may then open automatically.

4. In a dumping vehicle, and in combination, a chassis, a body having two portions capable of a differential tilting movement with respect to the chassis, a gate carried by one portion, and stop means carried by the second portion for holding the gate closed prior to tilting of the body and displaceable by a differential tilt of said second portion, whereby the gate may automatically open after tilting under the weight of the load.

5. In a dumping vehicle, and in combination, a chassis, a body having two portions capable of a differential tilting movement with respect to the chassis, a gate pivoted to one portion to swing about the bottom, posts carried by the second portion for engaging the gate and holding it closed prior to tilting of the body, said second portion being differentially tiltable, after tilting of the first portion, under the weight of the load acting against the gate, thereby to permit the gate to open automatically.

6. In a dumping vehicle, and in combination, a chassis, a body having two portions capable of a differential tilting movement with respect to the chassis, a gate pivoted to one portion, stop means carried by the second portion for engaging the gate and holding it closed prior to tilting of the body and displaceable by a differential tilt of said second portion, said second portion being differentially tilted, after tilting of the first portion, under the weight of the load acting against the gate, thereby to permit the gate to open automatically, said first portion having a part serving as a support for the gate when in open position.

7. In a dumping vehicle and in combination, a chassis, a body comprising a supplemental frame pivotally mounted on the chassis and a main frame pivotally mounted on the supplemental frame, a gate carried by the supplemental frame and pivoted to swing about the bottom, stop elements carried by the main frame for holding the gate closed prior to tilting of the body, the main frame being capable of a differential tilting movement thereby to displace the stop elements and permit the gate to open under the weight of the load.

8. In a dumping vehicle, and in combination, a chassis, a body comprising a supplemental frame mounted to tilt with respect to the chassis, and a main frame mounted to tilt with respect to the supplemental frame, the supplemental frame comprising beam elements extending in the direction of tilt a substantial distance beyond the main frame, whereby the main frame can continue to tilt after the supplemental frame engages the ground, a gate pivotally connected with the supplemental frame, and stop posts carried by the main frame and arranged to engage said gate to hold it closed prior to differential tilting and to be withdrawn upon differential tilting to permit the gate to open.

9. In a dumping vehicle, and in combination, a chassis, a body having a pivotal connection with the chassis whereby the body may tilt to dump the load, a gate for normally confining the load, and means for holding the gate closed prior to tilting of the body, said means being rendered inoperative by the weight of the load against the gate after a given tilting of the body, whereby the gate may then open automatically and being automatically rendered operative upon a reverse tilt of the body.

10. In a dumping vehicle, and in combination, a chassis, a body having a pivotal connection with the chassis whereby the body may tilt to dump the load, a swinging gate for normally confining the load, and stop elements for holding the gate closed prior to tilting of the body, said stop elements being displaceable, after a given tilting of the body, by the weight of the load against the gate, whereby the gate may then open automatically and being automatically returned to stop position upon a reverse tilt of the body, thereby to close the gate.

11. In a dumping vehicle, and in combination, a chassis, a body having two portions capable of a differential tilting movement with respect to the chassis, a gate pivoted to one portion to swing about the bottom, posts carried by the second portion for engaging the gate and holding it closed prior to tilting of the body, said second portion being differentially tiltable, after tilting of the first portion, under the weight of the load acting against the gate, the gate being closed by said posts upon a reverse tilt of the body.

12. In a dumping vehicle, and in combination, a chassis, a tiltable trackway carried by the chassis and having two side channel elements, a roller frame comprising two shafts, a pair of rollers on each of said shafts, said roller frame being mounted on the tiltable trackway to have its rollers running in said channel elements, a body mounted to roll on said rollers, cooperating elements on the roller frame and body for permitting tilting of the body after a given rolling movement, and means for tilting said trackway to permit the roller frame and body to roll by gravity to dumping position.

13. In a dumping vehicle, and in combination, a chassis, a trackway pivoted intermediate its ends to said chassis, a body, a roller connection between the body and said trackway, a rock shaft on the chassis below the forward part of the trackway, front bell crank levers on said rock shaft, links connecting said bell crank levers and said trackway, means including an operating lever for rocking said rock shaft, a cross rod on the chassis below the rear part of the trackway, rear bell crank levers mounted on said cross rod, links connecting one arm of each rear bell crank with the trackway, and links connecting the other arm of each rear bell crank with an arm of the corresponding front bell crank.

In testimony whereof, I have hereunto set my hand.

LOUIS DA COSTA CARVALHO.